United States Patent Office 3,471,493
Patented Oct. 7, 1969

3,471,493
PYRIDAZONE DERIVATIVES CONTAINING THE RADICAL OF THE HALF-ESTER OF A DICARBOXYLIC AMIDE
Franz Reicheneder, Ludwigshafen (Rhine), Germany, and Karl Dury, deceased, late of Kirchheim-Balanden, Germany, by Franz Winter, representative of heir, Ludwigshafen (Rhine), Germany, and Adolf Fischer, Mutterstadt, Pfalz, Germany, assignors to Badische Anilin- & Soda-Fabrik Aktiengesellschaft, Ludwigshafen (Rhine), Germany
No Drawing. Filed Nov. 8, 1966, Ser. No. 592,953
Claims priority, application Germany, Dec. 15, 1965, B 84,974
Int. Cl. C07d 51/02, 51/04; A01n 9/22
U.S. Cl. 260—250           5 Claims

ABSTRACT OF THE DISCLOSURE

Pyridazones having the formula

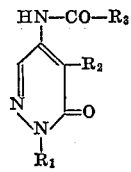

in which $R^1$ is phenyl, a substituted phenyl, cycloalkyl having 5 to 8 carbon atoms in the ring, a cycloalkyl substituted by methyl, fluorine, chlorine, or bromine, $R^2$ is halogen and $R^3$ is the radical —$COOR^4$, —$COSR^4$ or —$CH_2$—$CH_2$—$COOR^4$, —$CH$=$CH$—$COOR^4$ or

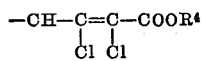

and $R^4$ is an unsubstituted or substituted alkyl radical, an alkenyl radical bearing chlorine as substituent, an unsubstituted or substituted aryl radical, an unsubstituted or substituted cycloalkyl radical, or an aralkyl radical. These pyridazones have excellent herbicidal properties.

---

The present invention relates to new pyridazone derivatives. In particular it relates to pyridazone derivatives containing the radical of the half-ester of a dicarboxylic amide. The invention also relates to methods of controlling unwanted plant growth with said compounds.

It is known that the active ingredient 1-phenyl-4-amino-5-chloropyridazone-(6) may be used as a selective herbicide (Canadian patent specification No. 677,143). It is also known that the active ingredient 2-chloro-4,6-bis(ethylamino)-s-triazine may be used as a total herbicide (U.S. patent specification No. 2,891,855). However their action is not satisfactory.

We have found that pyridazones having the formula

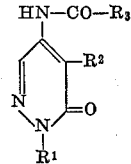

in which $R^1$ denotes a phenyl or cycloalkyl radical having five to eight carbon atoms in the cycloaliphatic ring which may bear methyl, fluorine, chlorine or bromine as substituent, $R^2$ denotes chlorine, bromine or iodine and $R^3$ denotes the radical —$COOR^4$, —$COSR^4$ or

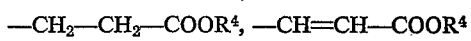
or

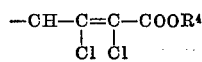

and $R^4$ denotes an alkyl radical which may bear a hydroxy, chlorine, methoxy or dialkylamino radical as substituent, an alkenyl radical having one to eighteen carbon atoms which bears chlorine as substituent, a phenyl radical which may bear chlorine, bromine or hydroxy as substituent, a cyclohexyl radical which may bear an ethynyl radical as substituent or a benzyl radical have good herbicidal action.

The pyridazones to be used according to this invention may be simply prepared by reacting the corresponding aminopyridazones with suitable acids followed by esterification. For example ethyl-4-[(1-phenyl-5-bromopyridazon-6)-yl]oxamate may be obtained by reacting 1-phenyl-4-amino-5-bromopyridazone-(6) with oxalyl chloride and subsequent esterification with ethanol. As all the other compounds according to the present invention may be prepared by an analogous method, this method will now be described in detail.

10 parts by weight of 1-phenyl-4-amino-5-bromopyridazone-(6) is heated under reflux in 100 cc. of oxalyl chloride until the solution is clear and after the solution has cooled the precipitated oxamic chloride is suction filtered. The oxamic chloride is mixed with 200 parts of ethyl alcohol and heated shortly at the boil and the solution is evaporated. After cooling, 8 parts of ethyl-4-[(1-phenyl-5-bromopyridazon-6)-yl]oxamate crystallizes out (melting point 135° to 136° C.).

The other compounds to be used according to the invention may be obtained by analogous methods.

The following compounds are given as examples of agents of the invention which are suitable for regulating plant growth:

Ethyl-4-[(1-phenyl-5-chloropyridazon-6)-yl]oxamate, M.P. 132° to 133° C.
Methyl-4-[(1-phenyl-5-bromopyridazon-6)-yl]oxamate, M.P. 151° to 152° C.
Ethyl-4-[(1-phenyl-5-bromopyridazon-6)-yl]oxamate, M.P. 135° to 136° C.
β-Ethoxyethyl-4-[(1-phenyl-5-bromopyridazon-6)-yl]oxamate, M.P. 70° to 72° C.
Octadecanoyl-4-[(1-phenyl-5-chloropyridazon-6)-yl]oxamate, M.P. 75° to 77° C.
Octadecanoyl-4-[(1-phenyl-5-bromopyridazon-6)-yl]oxamate, M.P. 77° to 79° C.
β-Chloroethyl-4-[(1-phenyl-5-bromopyridazon-6)-yl]oxamate, M.P. 102° to 104° C.
Thiophenyl-4-[(1-phenyl-5-bromopyridazon-6)-yl]oxamate, M.P. 167° to 168° C.

The agents for regulating plant growth according to the invention may be applied as solutions, emulsions, suspensions or dusts. The form of application depends entirely on the purpose for which the agents are being used; in any case it should ensure a fine distribution of the active ingredient.

For the preparation of solutions to be sprayed, direct mineral oil fractions with medium to high boiling points, such as kerosene or diesel oil, coal-tar oils and oils of vegetable and animal origin, cyclic hydrocarbons, such as tetrahydronaphthalene, and alkylated naphthalenes are suitable.

Aqueous formulations may be prepared from emulsion concentrates, pastes or wettable powders (spray powders) by adding water. To prepare emulsions the ingredients as such or dissolved in a solvent may be homogenized in water by means of wetting or dispersing agents. Concentrates which are suitable for dilution with water may be prepared from active ingredient, emulsifying or dispersing agent and possibly solvent. Compounds having adequate basicity may be used as salts in aqueous solution even after formation of the salt.

Dusts may be prepared by mixing or grinding the active ingredients with a solid carrier.

The following comparative experiments demonstrate the superiority of the compositions according to this invention.

EXAMPLE 1

Plastic pots having a diameter of 8 cm. are filled with loamy sandy soil in a greenhouse and then sown with seeds of beet (*Beta vulgaris*), Indian corn (*Zea mays*), potatoes (*Solanum tuberosum*), peas (*Pisum sativum*), gallant soldier (*Galinsoga parviflora*), chamomile (*Matricaria chamomilla*), white goosefoot (*Chenopodium album*), corn marigold (*Chrysanthemum segetum*), small nettle (*Urtica urens*), common chickweed (*Stellaria media*), annual meadow grass (*Poa annua*) and slender foxtail (*Alopecurus myosuroides*). Then the soil prepared in this way is treated with 2 kg./ha. of methyl-4-[(1-phenyl-5-bromopyridazon-6)-yl]oxamate (I), benzyl-4-[(1-phenyl-5-bromopyridazon-6)-yl]oxamate (II) and, for comparison, with 2 kg./ha. of 1-phenyl-4-amino-5-chloropyridazone-(6) (III), dispersed in 500 liters of water per hectare. Four to five weeks later it is evident that I and II have a stronger herbicidal action than III. The herbicidal action can be seen from the following table.

|  | Active ingredient | | |
|---|---|---|---|
|  | I | II | III |
| Crop plants: |  |  |  |
| Beet | 0 | 0 | 0 |
| Indian corn | 0 | 0 | 0-10 |
| Potatoes | 0-10 | 10 | 10-20 |
| Peas | 0 | 0 | 10 |
| Unwanted plants: |  |  |  |
| Gallant soldier | 90-100 | 90-100 | 70-80 |
| Chamomile | 90 | 90-100 | 70-80 |
| White goosefoot | 90-100 | 90-100 | 70-80 |
| Corn marigold | 90-100 | 90-100 | 80-90 |
| Small nettle | 100 | 100 | 90 |
| Common chickweed | 90 | 90-100 | 80-90 |
| Annual meadow grass | 80-90 | 90 | 60 |
| Slender foxtail | 70-80 | 70-80 | 40-50 |

0 = no damage.
100 = tota destruction.

The following have the same biological action as I in Examples 1, 2, 3 and 4:

Ethyl-4-[(1-phenyl-5-iodopyridazon-6)-yl]oxamate
Isopropyl-4-[(1-phenyl-5-bromopyridazon-6)-yl]succinate
β-Chloroethyl-4-[(1-p-chlorophenyl-5-chloropyridazon-6)-yl]maleate
β-Hydroxyethyl-4-[(1-p-bromophenyl-5-bromopyridazon-6)-yl]oxamate
Octadecanyl-4-[(1-chlorophenyl-5-bromopyridazon-6)-yl]oxamate
Methoxymethyl-4-[(1-p-chlorophenyl-5-bromopyridazon-6)-yl]oxamate
1-ethynylcyclohexyl-4-[(1-p-fluorophenyl-5-bromopyridazon-6)-yl]oxamate
Pentachlorophenyl-4-[(1-p-methylphenyl-5-bromopyridazon-6)-yl]oxamate
m-Bromophenyl-4-[(1-p-methylphenyl-5-bromopyridazon-6)yl]oxamate
Methyl-4-[(1-cyclopentyl-5-bromopyridazon-6)-yl]oxamate
Thiophenyl-4-[(1-cyclohexyl-5-bromopyridazon-6)-yl]oxamate
Isopropyl-4-[(1-cyclooctyl-5-bromopyridazon-6)-yl]oxamate
Octadecanyl-4-[(1-methylcyclohexyl-5-bromopyridazon-6)-yl]oxamate
m-Chlorophenyl-4-[(1-cyclohexyl-5-bromopyridazon-6)-yl]oxamate
p-Hydroxyphenyl-4-[(1-cyclohexyl-5-bromopyridazon-6)-yl]oxamate
Ethynylcyclohexyl-4-[(1-cyclohexyl-5-bromopyridazon-6)-yl]oxamate
2′,3′,3′-trichloroallyl-4-[(1-phenyl-5-chloropyridazon-6)-yl]oxamate
β-Diethylaminoethyl-4-[(1-phenyl-5-chloropyridazon-6)-yl]oxamate
Ethyl-4-[(1-phenyl-5-chloropyridazon-6)-yl]dichloromaleate

EXAMPLE 2

In a greenhouse the plants beet (*Beta vulgaris*), Indian corn (*Zea mays*), barley (*Hordeum vulgare*), wheat (*Triticum vulgare*), onions (*Allium cepa*), wild mustard (*Sinapis arvensis*), white goosefoot (*Chenopodium album*), common chickweed (*Stellaria media*), gallant soldier (*Galinsoga parviflora*), annual meadow grass (*Poa annua*) and cockspur panicum (*Panicum crus-galli*) are treated at a growth height of 3 to 15 cm. with 2 kg./ha. of methyl-4-[(1-phenyl-5-bromopyridazon-6)-yl]oxamate (I), benzyl - 4 - [(1 - phenyl - 5 - bromopyridazon - 6) - yl] oxamate (II) and, for comparison, with 2 kg./ha. of 1-phenyl-4-amino-5-chloropyridazone-6 (III), dispersed in 500 liters of water per hectare. Three to four weeks later it is evident that I and II have a stronger herbicidal action than III. The herbicidal action can be seen from the following table.

|  | Active ingredient | | |
|---|---|---|---|
|  | I | II | III |
| Crop plants: |  |  |  |
| Beet | 0 | 0 | 0 |
| Indian corn | 0 | 0-10 | 10 |
| Barley | 0 | 10 | 20 |
| Wheat | 0-10 | 0-10 | 20 |
| Onions | 0-5 |  | 10 |
| Unwanted plants: |  |  |  |
| Wild mustard | 100 | 100 | 80 |
| White goosefoot | 90-100 | 100 | 80 |
| Common chickweed | 90-100 | 90 | 70-80 |
| Gallant soldier | 90-100 | 90-100 | 70-80 |
| Small nettle | 100 | 90-100 | 90 |
| Annual meadow grass | 90-100 | 90-100 | 60-70 |
| Cockspur panicum | 70-80 | 80 | 40 |

0 = no damage.
100 total destruction.

EXAMPLE 3

An experimental area which has been sown with gallant soldier (*Galinsoga parviflora*), chamomile (*Matricaria chamomilla*), white goosefoot (*Chenopodium album*), corn marigold (*Chrysanthemum segetum*), small nettle (*Urtica urens*), common chickweed (*Stellaria media*), annual meadow grass (*Poa annua*), and slender foxtail (*Alopecurus myosuroides*) is sprayed on the day of sowing with 5 kg./ha. of methyl-4-[(1-phenyl-5-bromopyridazon-6)-yl]oxamate (I), benzyl-4-[(1-phenyl-5-bromopyridazon-6)-yl]oxamate (II) and, for comparison, with 5 kg./ha. of 2-chloro-4,6-bis(ethylamino)-s-triazine (III), dispersed in 500 liters of water per hectare. Three to four weeks later it is evident that the active ingredients I and II have completely destroyed the broadleafed and grass weeds, whereas the weeds are not completely destroyed by active ingredient III.

EXAMPLE 4

An agricultural cultivated area overgrown wtih gallant soldier (*Galinsoga parviflora*), chamomile (*Matricaria chamomilla*), white goosefoot (*Chenopodium album*), corn marigold (*Chrysanthemum segetum*), small nettle (*Urtica urens*), common chickweed (*Stellaria media*), annual meadow grass (*Poa annua*) and slender foxtail (*Alopecurus myosuroides*) is sprayed at a growth height of the weeds of 3 to 8 cm. with methyl-4-[(1-phenyl-5-bromopyridazon-6)-yl]oxamate (I), benzyl-4-[(1-phenyl-5-bromopyridazon-6)-yl]oxamate (II) and, for comparison, with 2-chloro-4,6-bis(ethylamino)-s-triazine (III), each at a rate of application of 5 kg. of active ingredient per hectare, dispersed in 500 liters of water per hectare. Eight days later the broadleafed and grass weeds treated with active ingredients I and II exhibit severe damage, whereas the plants sprayed with III exhibit normal growth. After three weeks almost all the plants are completely withered.

We claim:
1. Methyl - 4 - [(1 - phenyl - 5 - bromopyridazon - 6) - yl]oxamate.
2. Benzyl - 4 - [(1 - phenyl - 5 - bromopyridazon - 6) - yl]oxamate.
3. Ethyl - 4 - [(1 - phenyl - 5 - chloropyridazon - 6) - yl]oxamate.
4. Ethyl - 4 - [(1 - phenyl - 5 - bromopyridazon - 6) - yl]oxamate.
5. A compound having the formula

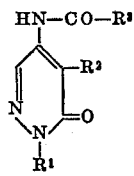

wherein $R^1$ is phenyl, phenyl substituted by methyl, fluorine, chlorine or bromine, cycloalkyl of 5 to 8 carbon atoms, cycloalkyl of 5 to 8 ring carbon atoms substituted by methyl, fluorine, chlorine or bromine, $R^2$ is chlorine, bromine or iodine, and $R^3$ is —COOR$^4$, —COSR$^4$, —CH$_2$—CH$_2$—COOR$^4$, —CH=CH—COOR$^4$, or

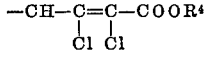

and $R^4$ is alkyl of 1 to 18 carbon atoms, alkyl of 1 to 18 carbon atoms substituted by hydroxy, chlorine, methoxy, ethoxy or diethylamino, alkenyl of 1 to 18 carbon atoms, alkenyl of 1 to 18 carbon atoms substituted by chlorine, phenyl, phenyl bearing a chlorine, bromine or hydroxy substituent, benzyl, cyclohexyl, and ethynylcyclohexyl.

No references cited.

NICHOLAS S. RIZZO, Primary Examiner

U.S. Cl. X.R.

71—92